United States Patent [19]

Fiene et al.

[11] Patent Number: 5,181,698
[45] Date of Patent: Jan. 26, 1993

[54] HYDRAULICALLY DAMPING RUBBER BEARING

[75] Inventors: Rüdiger Fiene, Bad Godesberg; Wilhelm Mayerböck, Kirchdaun, both of Fed. Rep. of Germany

[73] Assignee: BOGE Aktiengesellschaft, Eitorf, Fed. Rep. of Germany

[21] Appl. No.: 824,068

[22] Filed: Jan. 23, 1992

[30] Foreign Application Priority Data

Feb. 2, 1991 [DE] Fed. Rep. of Germany ....... 4103012

[51] Int. Cl.⁵ .............................................. F16F 13/00
[52] U.S. Cl. ................... 267/140.12; 267/219
[58] Field of Search ............. 267/219, 220, 140.1 C, 267/140.1 R; 180/300, 312, 902; 248/562, 636, 638

[56] References Cited

U.S. PATENT DOCUMENTS 4,700,934 10/1987 Andra et al. ............... 267/140.1 C
4,953,833 9/1990 Schmidt et al. ............. 267/140.1 C
4,958,811 9/1990 Brenner et al. ............. 267/140.1 C

FOREIGN PATENT DOCUMENTS 3736162 5/1989 Fed. Rep. of Germany .

Primary Examiner—Douglas C. Butler
Attorney, Agent, or Firm—Nils H. Ljungman and Associates

[57] ABSTRACT

Hydraulically damping rubber bearing, consisting of a divided inner part, an outer part located at some distance from the inner part, and rubber springs inserted between the inner part and the outer part, in which bearing there are at least two chambers hydraulically connected to one another by at least one throttle passage and filled with damping medium, whereby at least one of the chambers, over at least a portion of its axial limit, is bordered by an axially and/or radially movable, membrane-like end wall designed as one piece with the rubber spring, whereby the component containing the throttle passage is designed in two parts and is fastened and sealed in a recess in the inner part.

20 Claims, 3 Drawing Sheets

HYDRAULICALLY DAMPING RUBBER BEARING

BACKGROUND OF THE INVENTION

1. Field of the Invention

This invention relates to a hydraulically damping rubber bearing, comprising a divided inner part, an outer part located at some distance therefrom, and preferably a rubber spring inserted therebetween, in which rubber bearing there are at least two chambers filled with damping fluid. The two chambers are preferably hydraulically connected to one another by means of at least one throttle passage, whereby at least one of the chambers, over at least a partial area of its axial limit, may be bordered by an axially and/or radially movable, membrane-like end wall preferably formed as one piece with the rubber spring.

2. Background Information

Known are hydraulically damping rubber bearings (e.g. German Published Patent Application No. 37 36 162), in which an outer and an inner tube are connected to one another by a spring body, whereby the spring body contains two chambers, one behind the other in the direction of the induced vibrations. The chambers are connected by an opening and are filled with fluid. One of the chambers is bordered over at least a portion of its axial limit by an axially movable end wall which is designed as one piece with the spring body. Inside the chambers, in the vicinity of the outer tube, runs the opening designed as a passage, whereby there are also stops in the chambers. One disadvantage of such rubber bearings is that the opening designed as a passage requires a complex and expensive seal, so that there are no leaks between the passage and the chambers. The stops are also vulcanized onto the passage component, so that when the passage component is being manufactured, care must be taken that no rubber enters into the passage itself.

OBJECT OF THE INVENTION

The object of the invention is to refine a hydraulically damping rubber bearing so that the throttle passage may be located in a simple component which is easy to assemble and install, and which simultaneously guarantees a secure seal and correct assembly in relation to the inner part of the bearing.

SUMMARY OF THE INVENTION

This object is achieved by the hydraulically damping bearing of the present invention, in that there is preferably a divided inner part, an outer part located at some distance from the divided inner part, and elastomer springs, such as rubber springs, inserted between the divided inner part and the outer part. Further, the bearing preferably has at least two chambers therewithin, which may be filled with a damping medium. Preferably, the chambers are hydraulically connected to one another by means of at least one throttle passage, whereby at least one of the chambers, over at least a portion of the axial limit of the chamber, is preferably bordered by an axial and/or radially movable, membrane-like wall. The end wall may be designed as one piece with the rubber spring. The component containing the throttle passage is designed in two parts, is fixed in a recess in the inner part, and is held there in a sealed manner.

An advantage of the embodiment described above is that the component containing the throttle passage may be easily assembled and installed. The entire component may even be prefabricated using only a few individual parts, so that during the installation, the component can be moved or assembled axially.

In an additional embodiment, the throttle passage is located in the vicinity of the separation plane of the component containing the throttle passage.

In one configuration of the invention, a gasket may be located between the throttle passage and the area of separation of the component containing the throttle passage, facing the inner part of the bearing of the present invention.

In an additional embodiment, the gasket may be located in a groove in the vicinity of the separation plane of the component containing the throttle passage.

In an additional configuration of the invention, the component containing the throttle passage may have a stop in its outer region. One advantage of the arrangement wherein a stop is preferably provided in the outer region of the component, is that the stop may be fitted, buttoned, or snapped into an opening of the component containing the throttle passage, and that the opening of the component may be a dovetail groove.

In one configuration of the invention, the recess in the inner part may be designed as an offset.

In an additional configuration of the invention, the two parts of the inner part, on the neighboring end surfaces, each preferably have an extension for the formation of the recess. In other words, the end surfaces of the two parts of the inner part preferably have extensions for forming recesses.

In an additional embodiment, at least one of the inner parts is preferably provided, in the vicinity of the recess, with a deliberate or controlled rubber overflow for the formation of a gasket.

One aspect of the invention resides broadly in a hydraulically damping elastomeric bearing comprising: an outer member for encasing said bearing; an inner member for being disposed within said outer member; a resilient member means for retaining said inner member in said outer member; at least two chambers, said first chamber and said second chamber disposed between said inner member and said outer member; a component disposed about said inner member, said component comprising a throttle passage, said throttle passage connected between said first and said second chambers; and said component comprising two separate parts for dividing said component into substantial portions such that insertion of said component into said inner member is facilitated.

Another aspect of the invention resides broadly in a method for assembling a hydraulically damping rubber bearing, said method comprising the steps of: providing an outer member for encasing said bearing; mounting an inner member within said outer member; providing resilient member means for retaining said inner member and outer member; creating at least two chambers; said first chamber and said second chamber disposed between said inner member and said outer member; assembling a component from two separate parts; said two separate parts for dividing said components in substantial portions; creating a throttle passage in said component; mounting said component about said inner member; inserting said component into said inner member; connecting said throttle passage between said first and said second chambers for allowing passage of damping fluid between said first and second chamber.

BRIEF DESCRIPTION OF THE DRAWINGS

Preferred embodiments of the invention are illustrated schematically in the accompanying drawings wherein.

DESCRIPTION OF THE PREFERRED EMBODIMENTS

Figure 1:
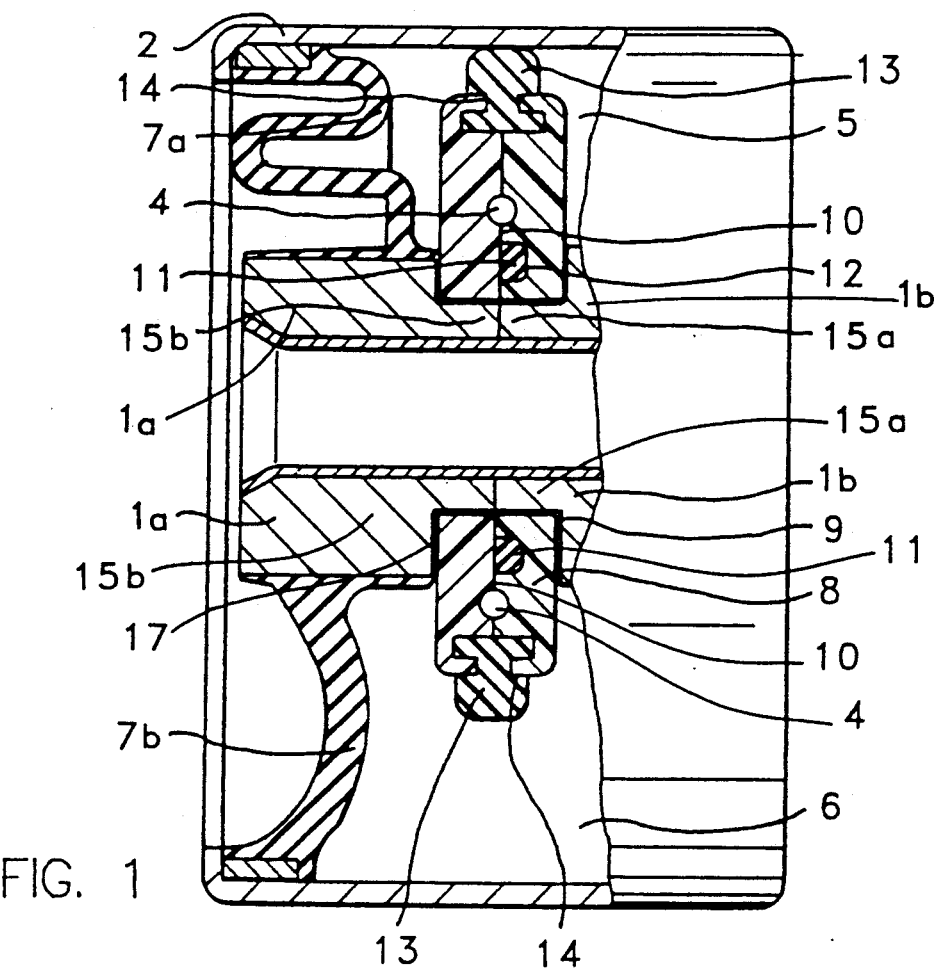
FIG. 1 shows a rubber bearing in cross section with a throttle passage and a membrane-like end wall as a detail.
Figure 2:
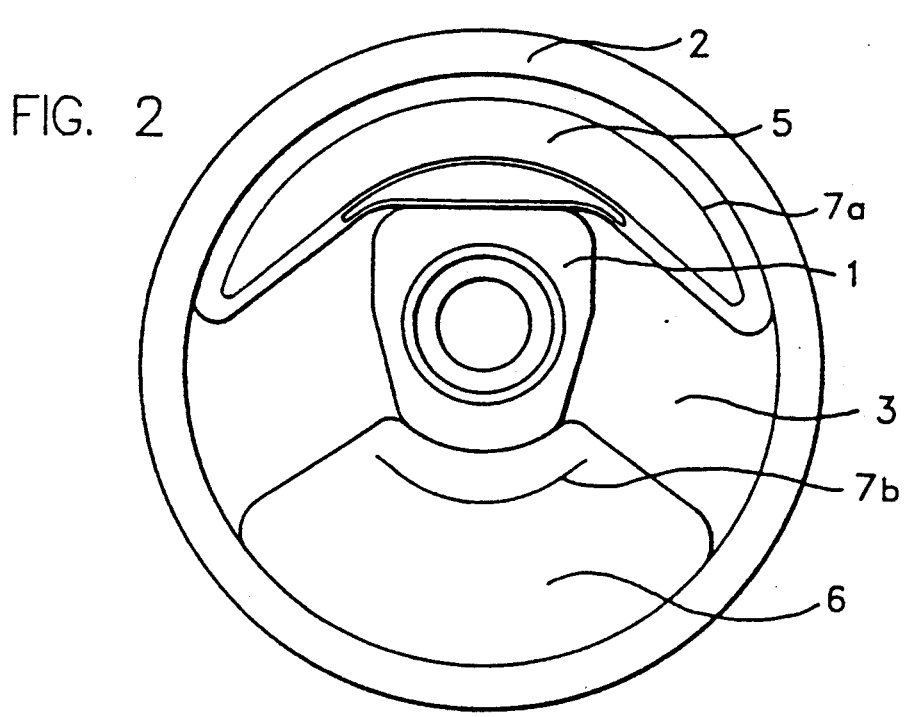
FIG. 2 shows a plan view of the rubber bearing indicated in FIG. 1.

On the hydraulically damping rubber bearing illustrated in FIGS. 1 and 2, there is an inner part 1 and an outer part 2, whereby the elastomer, preferably rubber, spring 3 may be inserted between the inner part 1 and the outer part 2. The rubber spring 3 forms the chambers 5 and 6, whereby the end walls are preferably sealed by membrane-like end walls 7a, 7b, at least one of which membrane-like end walls 7a, 7b is preferably serpentine. When an axial load is applied across the inner part of the bearing, the bearing preferably centers itself about the inner part 1.

The inner part 1 of the bearing is preferably divided into individual parts 1a and 1b, so that the rubber spring 3, together with the membrane-like end walls 7a, 7b, is designed with no undercutting, and thus guaranteeing correct fabrication, since the membrane-like end walls 7a, 7b may be appropriately removed or ejected from the mold. In other words, fabrication is designed for simple replacement of parts. By means of the two inner parts 1a and 1b, a recess 9 may be created, into which recess the component 8 containing the throttle passage 4 can be inserted.

For correct assembly, first the inner part 1a, together with the end wall 7 and the rubber spring 3, are preferably placed axially behind one another. Next, the component 8 and the inner part 1b are installed, preferably so that correct assembly is guaranteed by a seal 17.

The component 8 is essentially divided longitudinally in the vicinity of the separation plane 10, so that the throttle passage 4 may be introduced in the vicinity of the separation plane 10, as well as providing the ability to introduce an additional groove 12 in the component 8 to hold a gasket 11. In other words, the throttle passage 4 and an additional gasket groove 12 to hold a gasket 11 are preferably introduced in the vicinity of the longitudinally divided separation plane. If stops 13 are preferred, they may also be fitted into, buttoned into, or snapped into the vicinity of the separation plane 10.

The component 8 containing the throttle passage 4 may be prefabricated as a unit, by inserting a gasket 11 in the groove 12, installing the throttle passage appropriately and, if necessary, fitting in a stop 13, so that following the connection of the two parts of the component 8, the result is a finished component 8 together with a throttle passage 4.

By means of a deliberate and controlled rubber overflow in the vicinity of the recess 9, together with the gasket 12, not only is a simple assembly possible, but also a precise sealing of the component 8 containing the throttle passage in relation to the inner part 1. Particularly, by means of a provided or planned extension of elastomer, the component 8 comprising the throttle passage may be sealed in the recess 9. In other words, the elastomer material from the membrane-like end structure 7a, 7b may extend in a thin layer against the side wall of the recess 8 in such a manner as to precisely seal the component 8 containing the throttle passage 4 into the recess 9. Alternatively, the component 8 containing the throttle passage 4 may be precisely sealed into the recess 9 by means of vulcanization, gluing with silicon rubber, or other appropriate processes.

The stop 13 may be installed in the component 8 in an opening 14, which opening 14 is preferably in the form of a dovetail groove. The recess 9 may have the shape of the extensions 15a and 15b of the inner parts 1a and 1b, so that during the axial threading of the inner parts, the groove 9 may be created.

FIG. 1 shows, in a detail, a membrane-like end wall 7 together with inner parts 1a and 1b, whereby the component 8 contains a throttle passage 4 and the gasket 11 is located in a groove 12.

Furthermore, FIGS. 1 and 2 show a preferably cylindrical outer part 2 disposed about a preferably cylindrical inner part 1. An elastomer spring 3 is inserted between the inner part 1 and the outer part 2, this elastomer spring 3 preferably forms two chambers 5, 6 between the inner part 1 and the outer part 2. The outer end walls of the chambers 5, 6 are preferably sealed by membrane-like end walls 7a, 7b. At least one of the membrane-like end walls has a generally serpentine structure and at least another of the membrane-like end walls has a generally inward convex structure.

The inner part 1 of the bearing is preferably divided into two individual parts 1a, 1b having extensions 15a, 15b. These extensions provide for a recess 9, in the inner part, in which to seal a component 8 containing a throttle passage 4.

The component 8 may be divided into two separate parts along a separation plane 10 that is perpendicular to the axial plane of the inner part 1 and the outer part 2. A throttle passage 4 may be located within the component and substantially on the separation plane 10. The separation plane 10 may also contain a gasket groove 12 in at least one of the two separate parts of the component 8 in order to hold a gasket 11.

In another embodiment, the component 8 may again comprise two separate parts, at least one part comprising a gasket groove 12 for a gasket and at least one part comprising means for a throttle passage. The component 8 may be sealed into the recess 9 of the inner part 1 by means of an extension of elastomer from the membrane-like end means 7a, 7b. The elastomer material may be allowed to flow in a thin sealing layer from the membrane-like end means 7a, 7b into the recess 9 between the component 8 and the inner part 1, consequently hardening to form a precise seal between the component 8 and the inner part 1. In an advantageous embodiment, the membrane-like end walls may be removed in order to facilitate assembly and/or replacement of parts. In assembly, the component 8 containing the throttle passage 4 may be prefabricated before insertion into the recess 9 of the inner part 1. Prefabrication of the component 8 is accomplished by axially connecting together the separate parts of the component, at least one of which comprises a gasket 11. In assembly of the bearing itself, the inner part 1a, one side of the membrane-like end wall 7, and the elastomer spring 3 are placed axially one behind the other respectively as listed. The prefabricated component 8 and inner part 1b are then installed axially against inner part 1a and the elastomer spring 3 and the component is sealed by means of the elastomer extension of the membrane-like end wall.

Figure 3:
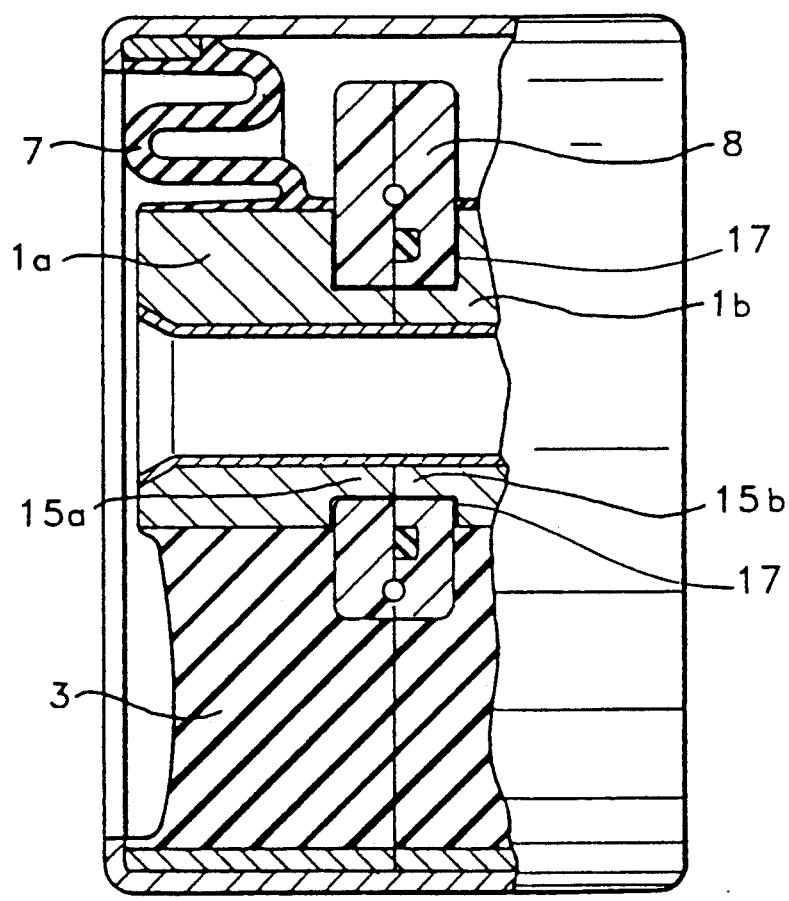
FIG. 3 shows an additional embodiment of a rubber bearing, with a throttle passage in cross section.

In another embodiment of the bearing, FIG. 3 shows an inner part 1a with a membrane-like end wall 7, as well as a rubber spring 3, whereby the component 8 may be axially installed on the extension 15a. The rubber spring 3 is shown in this embodiment to extend radially from end to end of the bottom half of the bearing, hence eliminating the need for a membrane-like end wall to seal the second chamber. FIG. 3 also shows a the component 8 and inner part 1, the bottom part of the component 8 and inner part 1 are considerably smaller in cross-section than the top part of the component 8 and inner part 1. This embodiment is preferably designed as such because a majority of the compressions may occur parallel to the separation plane. Further, component 8 shown in FIG. 3 does not contain an opening for a stop 13 and is preferably held in place by a seal 17.

Figure 4:
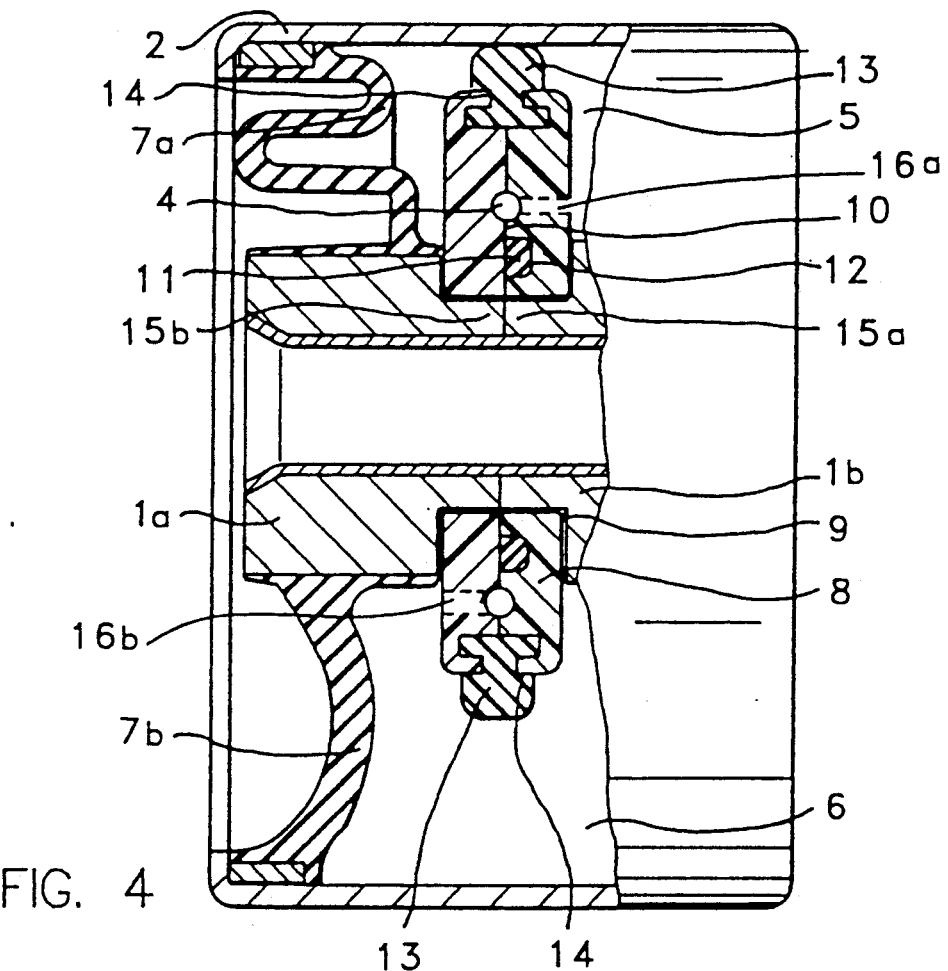
FIG. 4 shows an additional embodiment of a rubber bearing in cross section showing means for fluid communication.

In another embodiment of the bearing, FIG. 4 shows the component 8, comprising the throttle passage 4, which throttle passage 4 is a preferably circumferential channel, preferably permitting fluid flow through the entry passage 16a and the throttle passage 4 and out through passage 16b to permit fluid communication between the two chambers 5 and 6. The positions of entry passages 16a and 16b, and the dimensions thereof, should be chosen to provide the most efficient operation of the throttle passage 8.

In summary, one feature of the invention resides broadly in a hydraulically damping rubber bearing, comprising a divided inner part, an outer part preferably located at some distance from the divided inner part, and rubber springs inserted between them, in which rubber bearing there are at least two chambers, preferably filled with damping medium and hydraulically connected to one another by means of at least one throttle passage, whereby at least one of the chambers, over at least a portion of its axial limit, is bordered by an axial and/or radially movable, membrane-like end wall designed as one piece with the rubber spring, characterized by the fact that the component 8 containing the throttle passage 4 is designed in two parts, is fixed in a recess 9 in the inner part 1 and is held there in a sealed manner.

Another feature of the invention resides broadly in a rubber bearing, characterized by the fact that the throttle passage 4 is located in the vicinity of the separation plane 10 of the component 8 containing the throttle passage.

Yet another feature of the invention resides broadly in a rubber bearing, characterized by the fact that there may be a gasket 11 preferably located between the throttle passage 4 and the area of the component 8 containing the throttle passage facing the inner part 1.

A further feature of the invention resides broadly in a rubber bearing, characterized by the fact that the gasket 11 is preferably located in a groove 12 in the area of the separation plane 10 of the component 8 containing the throttle passage.

A yet further feature of the invention resides broadly in a rubber bearing, characterized by the fact that the component 8 containing the throttle passage may have a stop 13 in the component's outer area.

Yet another further feature of the invention resides broadly in a rubber bearing, characterized by the fact that a stop 13 may be fitted into, buttoned into, or snapped into an opening 14 of the component 8 containing the throttle passage.

An additional feature of the invention resides broadly in a rubber bearing, characterized by the fact that the opening 14 of the component containing the throttle passage is preferably a dovetail groove.

A yet additional feature of the invention resides broadly in a rubber bearing, characterized by the fact that the recess 9 of the inner part 1 of the rubber bearing may be designed as an offset.

A further additional feature of the invention resides broadly in a rubber bearing, characterized by the fact that the inner part 1 of the rubber bearing preferably being designed in two parts 1a, 1b, the end surfaces of these two part facing one another, each of the two parts preferably has an extension 15a, 15b for the formation of the recess 9.

A yet further additional feature of the invention resides broadly in a rubber bearing, characterized by the fact that at least one of the inner parts 1a, 1b has a controlled rubber overflow in the vicinity of the recess 9 to form a gasket.

A number of patents disclose sealing by means of vulcanization and similar processes. These patents, which are incorporated as if disclosed in their entirety herein, include the following: U.S. Pat. No. 5,034,852, issued to Rosenburg on Jul. 23, 1991; U.S. Pat. No. 4,943,070, issued to Lang on Jul. 24, 1990; U.S. Pat. No. 4,819,953, issued to Joh on Apr. 11, 1989; U.S. Pat. No. 4,075,755, issued to Bernatt on Feb. 28, 1978; and U.S. Pat. No. 4,746,130, issued to Abele on May 24, 1988.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. Hydraulically damping elastomeric bearing comprising;
   an outer member for encasing said bearing;
   an inner member for being disposed within said outer member;
   a resilient member means for retaining said inner member in said outer member;
   at least two chambers comprising first and second chambers said first chamber and said second chamber disposed between said inner member and said outer member;
   a component disposed about said inner member, said component comprising a throttle passage, said throttle passage connected between said first and said second chambers for allowing passage of damping fluid between said first and said second chamber; and said component comprising two separate parts for dividing said component into substantial portions such that insertion of said component into said inner member is facilitated.

2. The bearing according to claim 1, wherein said inner member comprises a recess, and said component is disposed in said recess.

3. The bearing according to claim 2, wherein said bearing comprises means for sealing said component against said recess.

4. The bearing according to claim 3, further comprising:

a separation plane dividing said component into said two separate parts; and said throttle passage being disposed in the general vicinity of said separation plane.

5. The bearing according to claim 4, wherein a portion of said throttle passage is indented in one of said separate parts of said component;

another portion of said throttle passage is indented in the other said separate part of said component; and both said portions of said throttle passage are substantially interfaced when said two separate parts of said component are interfaced.

6. The bearing according to claim 5, further comprising: a groove disposed substantially within said component in the vicinity of said separation plane of said component; and said gasket being disposed in said groove.

7. The bearing according to claim 6, further comprising a gasket being disposed substantially within said component, between said throttle passage and said inner member.

8. The bearing according to claim 7, wherein said component has an outer portion further comprising at least one stop being disposed at said outer portion of said component.

9. The bearing according to claim 8, further comprising:

at least one opening disposed in said outer portion; and each of said at least one stop being fitted into one of said at least one opening.

10. The bearing according to claim 9, wherein said one of at least one said opening is a dovetail groove.

11. The bearing according to claim 10, wherein said recess of said inner member comprises an offset.

12. The bearing according to claim 11, further comprising:

said inner member comprising two separate parts;

each of said separate parts of said inner member having an end surface, each said end surface facing the end surface of the other of said separate parts of said inner member; and each said separate part of said inner member comprising an extension at said end surface thereof to form a portion of said recess.

13. The bearing according to claim 12, wherein at least one of said parts of said inner member has an additional elastomer portion at said recess to form a seal between said component and said inner member.

14. The bearing according to claim 13, further comprising:

a plurality of membrane end wall means;

each of said membrane end wall means being connected between said inner member and said outer member; and two of said membrane end wall means defining said first chamber and another two of said membrane end wall means defining said second chamber.

15. The bearing according to claim 14, wherein at least one of said membrane end wall means defining said first chamber has a generally serpentine configuration.

16. The bearing according to claim 15, wherein at least one of said membrane end wall means defining said second chamber is generally convex towards said second chamber.

17. The bearing according to claim 16, wherein said gasket is substantially disposed in one of said two separate parts of said component; and said gasket is disposed flush against the other of said two separate parts of said component.

18. The bearing according to claim 17, wherein said throttle passage comprises a main passage disposed circumferentially within said inner member.

19. The bearing according to claim 18, further comprising:

a first and second entry passage for providing fluid communication between said main passage and each of said first chamber and said second chamber;

said recess having a generally rectangular cross-section;

said separation plane dividing said inner member into said first and second parts thereof;

said separation plane being disposed substantially perpendicularly to an axial direction of said outer member and said inner member;

a first one of said at least one stop being disposed in said first chamber and a second one of said at least one stop being disposed in said second chamber;

said first stop extending from said component towards said outer member for contacting said outer member;

at least one of said membrane-like end walls for extending into said recess to form said additional elastomer portion;

said additional elastomer portion being substantially thin;

at least one of said membrane-like end walls, defining said first chamber, having said generally serpentine form;

at least one of said membrane-like end walls, defining said second chamber, being generally convex towards said second chamber;

said outer member being generally cylindrical;

a hub portion being disposed through said bearing, said hub portion for being directly surrounded by said inner member;

said two separate parts of said component being two halves of said component;

said two separate parts of said inner member being two halves of said inner member;

said component for surrounding said inner member;

said component being generally cylindrical;

said component having a generally rectangular cross-section;

each of said first stop and said second stop having a generally flat end surface;

said generally flat end surface of said first stop for being substantially flush with said outer member;

said dovetail groove having a generally rectangular cross-section;

an inner spring means being disposed between said first chamber and said second chamber;

said first chamber and said second chamber being separated by said inner spring means and said inner member; and said inner spring means comprising an elastomer material.

20. A method for assembling a hydraulically damping rubber bearing, said method comprising the steps of:

providing an outer member for encasing said bearing;

mounting an inner member within said outer member;

providing resilient member means for retaining said inner member and outer member;

creating at least two chambers comprising first and second chambers;

said first chamber and said second chamber disposed between said inner member and said outer member;

assembling a component from two separate parts;

said two separate parts for dividing said components in substantial portions;

creating a throttle passage in said component;

mounting said component about said inner member;

inserting said component into said inner member;

connecting said throttle passage between said first and said second chambers for allowing passage of damping fluid between said first and said second chamber.

* * * * *